United States Patent
Castelli et al.

(10) Patent No.: US 10,007,516 B2
(45) Date of Patent: Jun. 26, 2018

(54) SYSTEM, METHOD, AND RECORDING MEDIUM FOR PROJECT DOCUMENTATION FROM INFORMAL COMMUNICATION

(71) Applicant: International Business Machines Corporation, Armonk, NY (US)

(72) Inventors: Vittorio Castelli, Croton on Hudson, NY (US); Radu Florian, Danbury, CT (US); Taesun Moon, Scarsdale, NY (US); Avirup Sil, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 15/075,262

(22) Filed: Mar. 21, 2016

(65) Prior Publication Data
US 2017/0269930 A1    Sep. 21, 2017

(51) Int. Cl.
*G06F 9/44*    (2018.01)
*G06F 8/77*    (2018.01)
(Continued)

(52) U.S. Cl.
CPC ............ *G06F 8/77* (2013.01); *G06F 8/73* (2013.01); *G06F 17/30011* (2013.01); *H04L 51/046* (2013.01); *H04L 51/16* (2013.01)

(58) Field of Classification Search
CPC ......... G06F 17/30011; G06F 17/30702; G06F 21/6263; G06F 8/73; H04L 51/04; H04L 51/16; H04L 65/403
See application file for complete search history.

(56) References Cited

U.S. PATENT DOCUMENTS

| | | | |
|---|---|---|---|
| 7,716,639 B2* | 5/2010 | Dahlin | G06Q 10/10 717/121 |
| 8,418,069 B2* | 4/2013 | Wanderski | G06Q 10/00 709/204 |

(Continued)

OTHER PUBLICATIONS

Jacki O'Neill et al.; Text Chat in Action; 2003 ACM; pp. 40-49; <https://dl.acm.org/citation.cfm?id=958167>.*

(Continued)

*Primary Examiner* — Thuy Dao
*Assistant Examiner* — Cuong V Luu
(74) *Attorney, Agent, or Firm* — Yeen Tham, Esq.; McGinn IP Law Group, PLLC

(57) ABSTRACT

A project documentation method, system, and non-transitory computer readable medium, include a matching circuit configured to match the multimodal communications between users stored in the database to the project, an identification circuit configured to associate a chat thread of the multimodal communications to a sub-project of the project, a relating circuit configured to relate words of the chat thread and words in text of the project, an extracting and creating circuit configured to extract text of the chat thread that is relevant to the text of the project and create a document including the relevant text of the chat thread, and a decision circuit configured to decide whether to update the document including the relevant text created by the extracting and creating circuit with newly extracted text based on a similarity between data of the document and the newly extracted text to avoid redundancies within the created document.

17 Claims, 5 Drawing Sheets

(51) Int. Cl.
*H04L 12/58* (2006.01)
*G06F 17/30* (2006.01)
*G06F 8/73* (2018.01)

(56) References Cited

U.S. PATENT DOCUMENTS

| | | | | |
|---|---|---|---|---|
| 9,456,012 | B2* | 9/2016 | Cohen | G06F 17/24 |
| 2004/0006762 | A1* | 1/2004 | Stewart | G06F 8/36 |
| | | | | 717/106 |
| 2008/0082619 | A1* | 4/2008 | Wanderski | G06Q 10/00 |
| | | | | 709/207 |
| 2009/0150490 | A1* | 6/2009 | Gile | G06Q 10/10 |
| | | | | 709/204 |
| 2009/0319993 | A1* | 12/2009 | Denver | G06F 8/24 |
| | | | | 717/121 |
| 2010/0088664 | A1* | 4/2010 | Khodabandehloo | G06F 8/20 |
| | | | | 717/103 |
| 2012/0072220 | A1* | 3/2012 | Zhang | G06F 17/3069 |
| | | | | 704/251 |
| 2013/0074032 | A1* | 3/2013 | Barragan Barragan | G06F 8/30 |
| | | | | 717/101 |
| 2013/0212563 | A1* | 8/2013 | Kraft | G06F 8/75 |
| | | | | 717/123 |
| 2014/0257910 | A1* | 9/2014 | Anders | G06Q 10/06313 |
| | | | | 705/7.23 |
| 2015/0127603 | A1* | 5/2015 | Cohen | G06F 17/24 |
| | | | | 707/608 |
| 2016/0335582 | A1* | 11/2016 | Suntinger | G06Q 10/06311 |

OTHER PUBLICATIONS

M. Hassan Shirali-Shahreza et al.; Text Steganography in Chat; 2007 IEEE; 5 pages; <http://ieeexplore.ieee.org/stamp/stamp.jsp?jp=arnumber=4401716>.*

Xu Zhe et al.; Text to Emotion Engine for Real Time Internet Communication; 2002 Citeseer; 5 pages; <http://citeseerx.ist.psu.edu/viewdoc/download?doi=10.1.1.474.2657&rep=rep1&type=pdf>.*

Varish Mulwad et al.; Extracting Information about Security Vulnerabilities from Web Text; 2011 IEEE; pp. 257-260; <http://ieeexplore.ieee.org/stamp/stamp.jsp?tp=&arnumber=6040854>.*

Ella Bingham et al.; Finding topics in dynamical text application to chat line discussions ; 2001 Posters; 2 pages; <http://www10.org/cdrom/posters/1110.pdf>.*

Rebecca Adams et al.; Writing to learn via text chat Task implementation and focus on form; 2012 Elsevier; pp. 23-39; <https://www.sciencedirect.com/science/article/pii/S1060374311000658>.*

* cited by examiner

120 # SYSTEM, METHOD, AND RECORDING MEDIUM FOR PROJECT DOCUMENTATION FROM INFORMAL COMMUNICATION

BACKGROUND

The present invention relates generally to a projection documentation system, and more particularly, but not by way of limitation, to a system for project documentation from informal communication.

Formally documenting a project in the form of wiki pages, bug reports and within code documentation is a critical but arduous process. Formal documentation can be ignored or downgraded in priority when there is an impending deadline in favor of actual deliverables. Poor project documentation can reduce the usability of the code by third parties, while poor implementation notes lead to questions about why a specific method of coding or implantation used.

Conventionally, discussion of a project is performed on a plurality of platforms. As a result, the discussion may never be associated with the project.

Thus, there is a technical problem in that the conventional techniques do not document a project while discussion is on a plurality of platforms.

SUMMARY

The inventors have considered the technical solution to the technical problem by mining the information from informal, multimodal communications between project personnel and converting them to a set of formal documents acceptable to the project. Thus, projects can be documented even if a plurality of platforms are used to discuss the project.

In an exemplary embodiment, the present invention can provide a project documentation system for generating documentation of a project from multimodal communications between users stored in a database, the system including a matching circuit configured to match the multimodal communications between users stored in the database to the project, an identification circuit configured to associate a chat thread of the multimodal communications to a sub-project of the project, a relating circuit configured to relate words of the chat thread and words in text of the project, an extracting and creating circuit configured to extract text of the chat thread that is relevant to the text of the project and create a document including the relevant text of the chat thread, and a decision circuit configured to decide whether to update the document including the relevant text created by the extracting and creating circuit with newly extracted text based on a similarity between data of the document and the newly extracted text to avoid redundancies within the created document.

Further, in another exemplary embodiment, the present invention can provide a project documentation method for generating documentation of a project from multimodal communications between users stored in a database, the method including matching the multimodal communications between users stored in the database to the project, associating a chat thread of the multimodal communications to a sub-project of the project, relating words of the chat thread and words in text of the project, extracting text of the chat thread that is relevant to the text of the project, creating a document including the relevant text of the chat thread, and deciding whether to update the document including the relevant text created by the extracting and creating circuit with newly extracted text based on a similarity between data of the document and the newly extracted text to avoid redundancies within the created document.

Even further, in another exemplary embodiment, the present invention can provide a non-transitory computer-readable recording medium recording a project documentation program for generating documentation of a project from multimodal communications between users stored in a database, the program causing a computer to perform: matching the multimodal communications between users stored in the database to the project, associating a chat thread of the multimodal communications to a sub-project of the project, relating words of the chat thread and words in text of the project, extracting text of the chat thread that is relevant to the text of the project, creating a document including the relevant text of the chat thread, and deciding whether to update the document including the relevant text created by the extracting and creating circuit with newly extracted text based on a similarity between data of the document and the newly extracted text to avoid redundancies within the created document.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
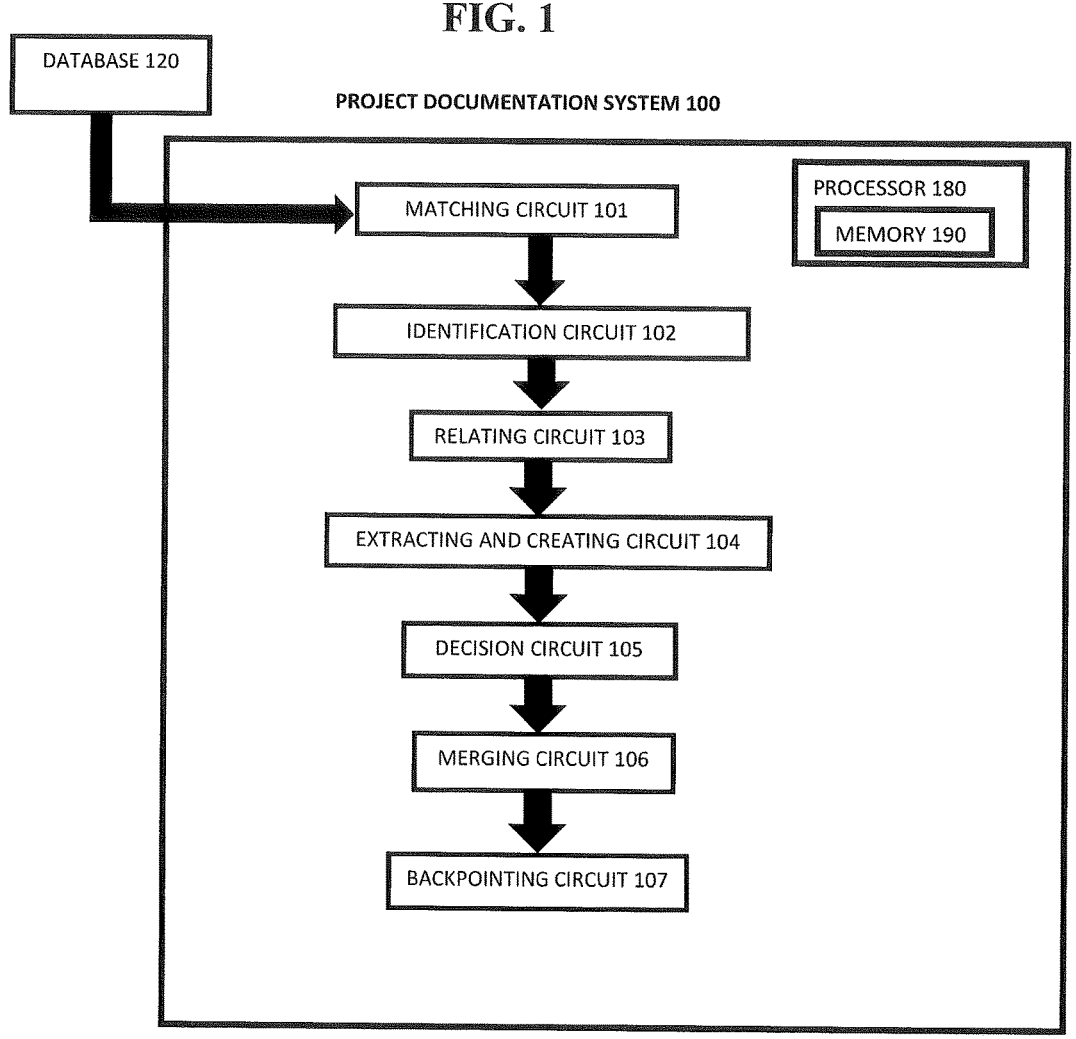
FIG. 1 exemplarily shows a block diagram illustrating a configuration of a project documentation system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the project documentation system 100 includes a matching circuit 101, an identification circuit 102, a relating circuit 103, an extracting and creating circuit 104, a decision circuit 105, a merging circuit 106, and a back pointing circuit 107. The project documentation system 100 includes a processor 180 and a memory 190, with the memory 190 storing instructions to cause the processor 180 to execute each circuit of project documentation system 100. The processor and memory may be physical hardware components, or a combination of hardware and software components.

Although the project documentation system 100 includes various circuits, it should be noted that a project documentation system can include modules in which the memory 190 stores instructions to cause the processor 180 to execute each module of project documentation system 100.

Also, each circuit can be a stand-alone device, unit, module, etc. that can be interconnected to cooperatively produce a transformation to a result.

With the use of these various circuits, the project documentation system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and kinematic sensors in a high dimensional measurement space) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a cognitive state. The present application also describes the analysis, categorization, and identification of these cognitive states by means of further feature analysis of subgraphs, including dimensionality reduction of the subgraphs, for example by means of graphical analysis, which extracts topological features and categorizes the resultant subgraph and its associated feature nodes and edges within a subgraph feature space.

Although shown in FIGS. 3-5 and as described later, the computer system/server 12 is exemplarily shown in cloud computing node 10 as a general-purpose computing circuit which may execute in a layer the project documentation system 100 (FIG. 5), it is noted that the present invention can be implemented outside of the cloud environment.

The database 120 includes informal and multimodal documentation in the form of, for example, e-mail, chat (e.g. IBM Notes, Gmail+Google Hangout/Chat, MS Outlook, etc.), Version control comments and release notes, Rational Team Concert, Project Management Plugins, etc. In other words, the database 120 includes all of the mined documentation (i.e., "documents") relating to a specific project. Each project includes sub-projects that are performed to complete the project.

The project documentation system 100 receives the data of the documents in the database 120 and the matching circuit 101 matches relevant communication to specific projects (or sub-projects). The matching circuit 101 can be an intelligent agent that learns how to match communications to projects based on user feedback over time. Also, the matching circuit 101 can use the database 120 to match keywords, project names and members and their roles across the projects. In other words, the matching circuit 101 matches relevant data to a particular project or sub-project and matches who is discussing the project.

Once the communications are identified as relevant to the project by the matching circuit 101, the identification circuit 102 refines the data by marking subsets of the communications, particularly threads, as possible units that can be linked to units of code that are to be documented. The identification circuit 102 can refine the data by unsupervised clustering algorithms such as bottom-up hierarchical clustering using textual similarity as a metric.

That is, the identification circuit 102 divides the relevant data of a particular project into subsets related to sub-projects to complete the main project. For example, if the matching circuit 101 matches multiple threads all relating to a first project even though they pertain to different sub-projects for the first project, some of the threads can be related to user interface development and other threads could be related to computational components and the like. The identification circuit 102 divides the threads into subsets according to the topic of the thread within the first project. Thus, all the threads relating to user interface development would be divided into one subset by the identification circuit 102 and all the threads relating to computational components are divided into a second subset by the identification circuit 102.

The relating circuit 103 associates or relates threads with code "units". Units may refer to class, package, method, field, etc. The relating circuit 103 relates individual words using text mining algorithms or methods that have been used in the chat conversation to individual words in the code of the project that has been written. That is, the relating circuit 103 determines a similarity between the individual words of the threads and the individual words in code. In other words, a bag of words is received by the relating circuit 103 from the identification circuit 102 for the threads and the relating circuit 103 uses classification strategies using the bag of words or embedding. Accordingly, the words of threads and the code are associated with one another and the data of the association is output to the extracting and creating circuit 104.

Also, given some way of segmenting variable and type names using clues such as camel casing and underscores as boundaries, the relating circuit 103 can use textual similarity between some type or variable in the code and the thread as additional evidence in the classifier. The relating circuit 103 can be an intelligent agent that can improve over time given user feedback.

Further, the relating circuit 103 can performing static code analysis to extract software components, characteristics, and dependencies, including, but not limited to, package names, class names, method names and signatures, data member names and classes, variables and their classes, and constants and their classes, and relating the extracted software component names and characteristics to formal and informal message subject lines and text using natural language processing techniques.

The extracting and creating circuit 104 extracts information that should go into the documentation about the project from the data output from the relating circuit 103 (i.e., from the chat threads). The extracting and creating circuit 104 applies a generative Natural Language Summarization algorithm to analyze the data output from the relating circuit 103 and extract a summary of the particular text. The summary can be a one-word, one-line, or a multiple line summary, but not limited thereto. The extracting and creating circuit 104 is an intelligent agent in that it can predict and improve based on the text data from the relating circuit 103 and past outputs, the length of the summary to provide for the particular text.

It is noted that unrelated text to a project can be removed prior to the extracting and creating circuit 104 summarizing the text or the extracting and creating circuit 104 can summarize the text by ignoring text that is not relevant.

For example, text can be mined relating to discussing a particular part of a project. But, chat relating to when to discuss the project is not relevant to information that should go into the documentation. This type of chat can be removed before or after the extracting and creating circuit 104 summarizes the text.

Also, the extracting and creating circuit 104 can extract explicit association in the form of information from communications including, but not limited to, version control messages.

The extracting and creating circuit 104 can further extract information about each user involved in the multimodal communications including the sub-project on which the user works, a role in the project for the user, and responsibilities of the user on each sub-project of the project. The extracted information is combined with information collected from multiple communications to create threads, where the information comprises the users involved in each communication, temporal information of each communication, software components associated with the communication, and project management information including timelines of software releases and timelines of agile scrums That is, after the threads and sub-projects are associated with each other by the relating circuit 103, the extracting and creating circuit 104 summarizes the chat threads and extracts the relevant text to the actual code that should be placed into the documentation about the project. The extracting and creating circuit 104 creates a document including the information about the project based on the extracted text.

The decision circuit 105 checks the document created by the extracting and creating circuit 104 for redundancies and similarities. The decision circuit 105 decides whether to update the document with new information from the extracting and creating circuit 104 if the redundancy or similarity is below a predetermined threshold. The predetermined threshold can be a learned value based on prior decisions, a user input value based on project requirements, or any value of the like. The decision circuit 105 can detect redundancies and similarities using Semantic Similarity techniques.

It is noted that the decision circuit 105 not only checks the document created by the extracting and creating circuit 104 for redundancies and similarities, but the decision circuit 105 checks the actual project code for notes to determine if the notes are already included for a particular part of the project. That is, it is common that code is commented on within the code and that the same comment is discussed within a chat medium separate from the code. In this manner, the decision circuit 105 can reduce redundancies and similarities of new inputs if the input is already in the document or the actual code comments.

In general, the matching circuit 101, the identification circuit 102, the relating circuit 103, the extracting and relating circuit 104, and the decision circuit 105 will iteratively match text from chat mediums to a project, identify the specific sub-project within the project and who is issuing the chat for the project, relate the identified text with the code, extracts summaries about the chat text and creates a separate document including the extracted text all while the decision circuit 105 checks the document and the code to decide if the extracted text should be added to the document. Such a decision may be based on whether the extracted text is already in the code or the document or similar to the text already in the code or the document. It is noted that "in the code" refers to comments that the programmers add directly into the coding interface while coding. The text in the document refers to the mined text from all other chat mediums not including the code.

The merging circuit 106 merges each document created together so that a "master" document updates as the project continues. That is, after each iteration, the merging circuit 106 merges the newly created document by the extracting and creating circuit 104 with the previous document for the project.

The back pointer circuit 107 adds "back pointers" from the text of the document to the thread from which the text was extracted. In other words, the document will include a hyperlink, pointer, etc. from each part of the text of the document to the original thread that the text was extracted from in the chat medium. Therefore, even if the summarization may not be the most accurate, a user can click on the text and read the entire conversation to better understand what the documentation is referencing. The "back pointers" can also point directly to the section of the code to which the text is referring.

Figure 2:
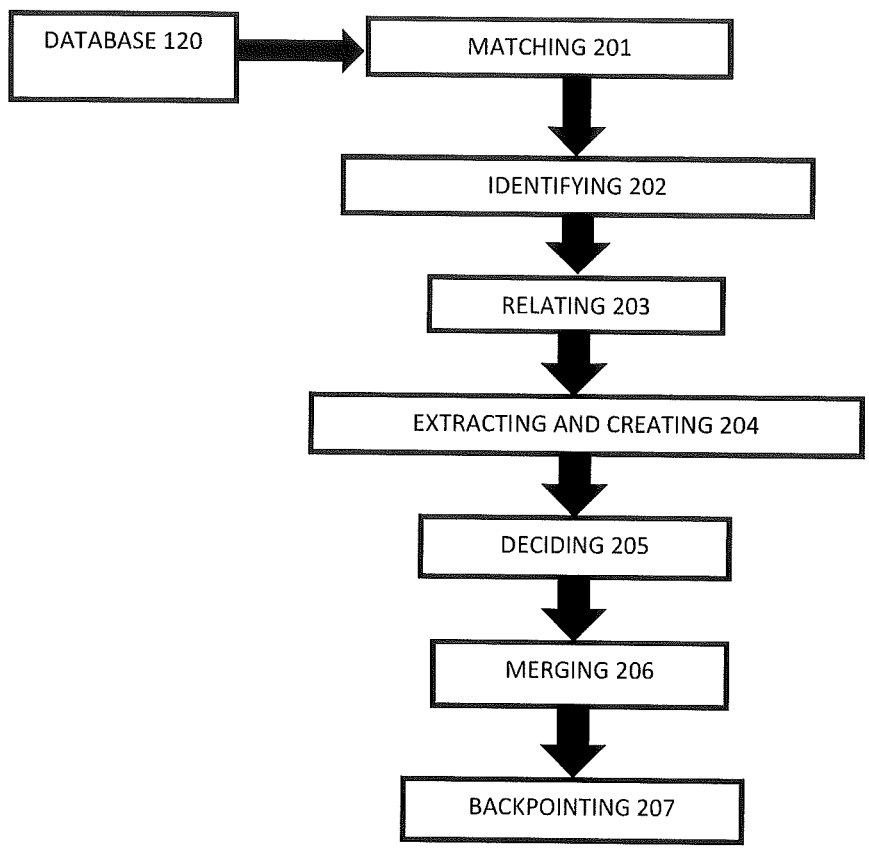
FIG. 2 exemplarily shows a high level flow chart for a project documentation method 200.

FIG. 2 shows a high level flow chart for a method 200 of project documentation.

Step 201 matches relevant communication to projects.

Step 202 identifies conversational threads across the different chat platforms and classifies the different chat threads into sub-project groups.

Step 203 relates individual words using text mining algorithms or methods that have been used in the chat conversation to individual words in the code of the project that has been written. That is, step 203 determines a similarity between the individual words of the threads and the individual words in the chat conversation from the documents. In other words, a bag of words is received by step 203 from step 202 for the threads and step 203 uses classification strategies using the bag of words or embedding. Accordingly, the words of threads and the code are associated with one another and the data of the association is output to step 204.

Step 204 extracts information from the sub-project threads and creates a document using the extracted information.

Step 205 decides whether to update the document with the extracted information based on redundancies and similarities between the extracted information and the current information on the document.

Step 206 merges each document creates together so that a "master" document updates as the project continues.

Step 207 adds "back pointers" from the text of the document to the thread from which the text was extracted.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
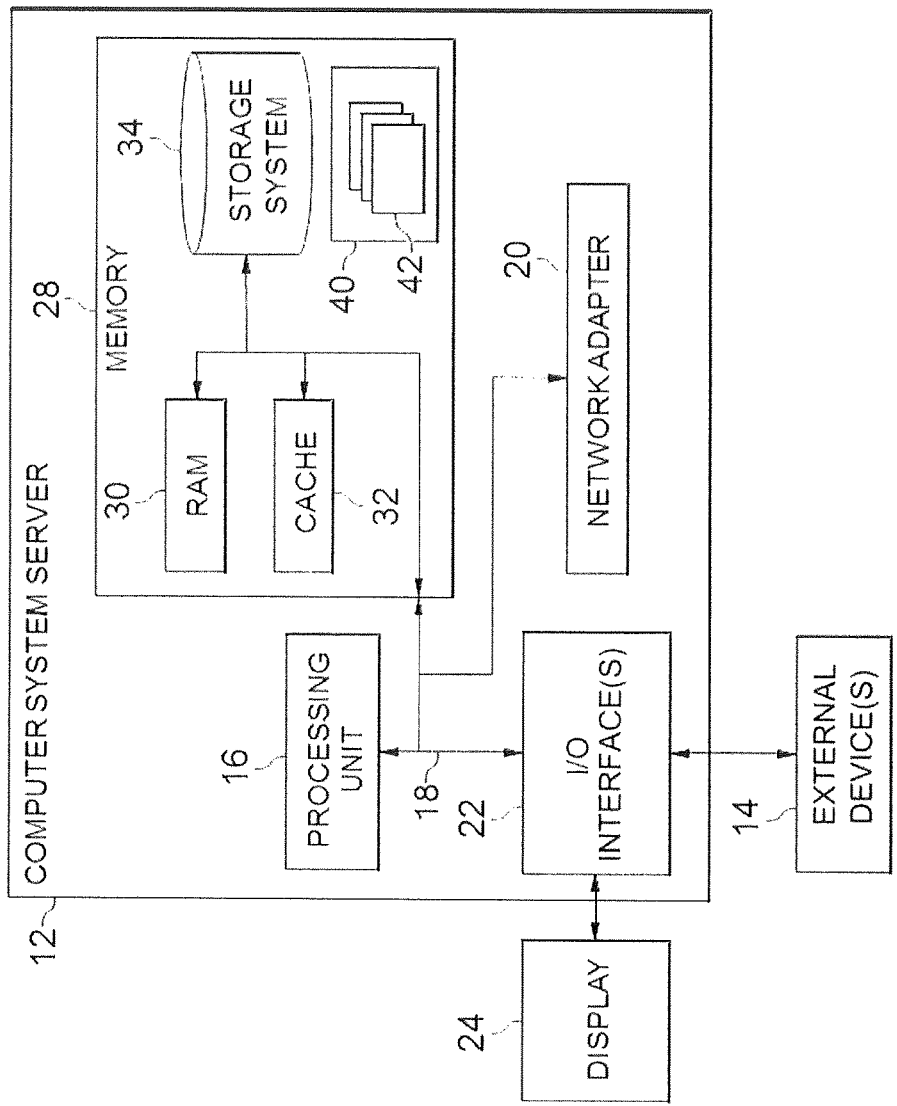
FIG. 3 depicts a cloud computing node 10 according to an embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
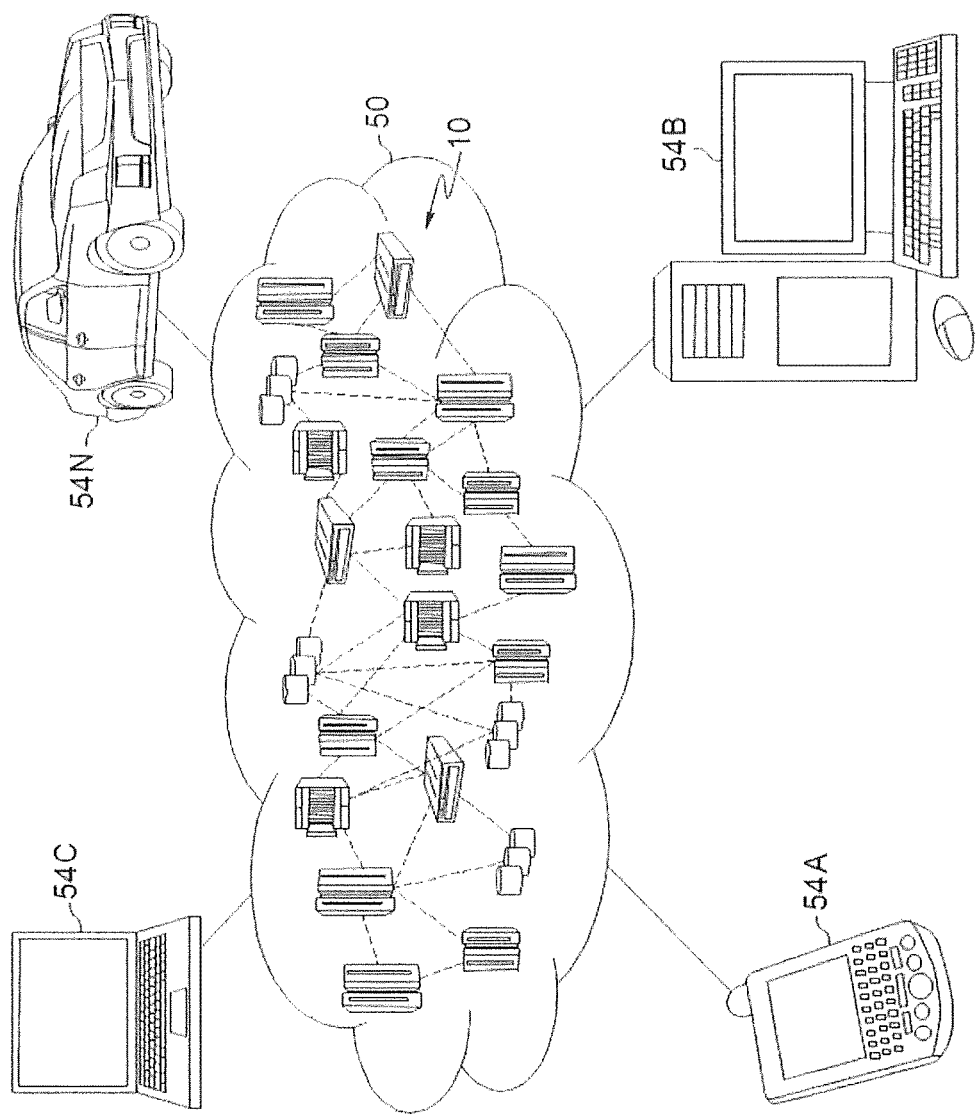
FIG. 4 depicts a cloud computing environment 50 according to another embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Figure 5:
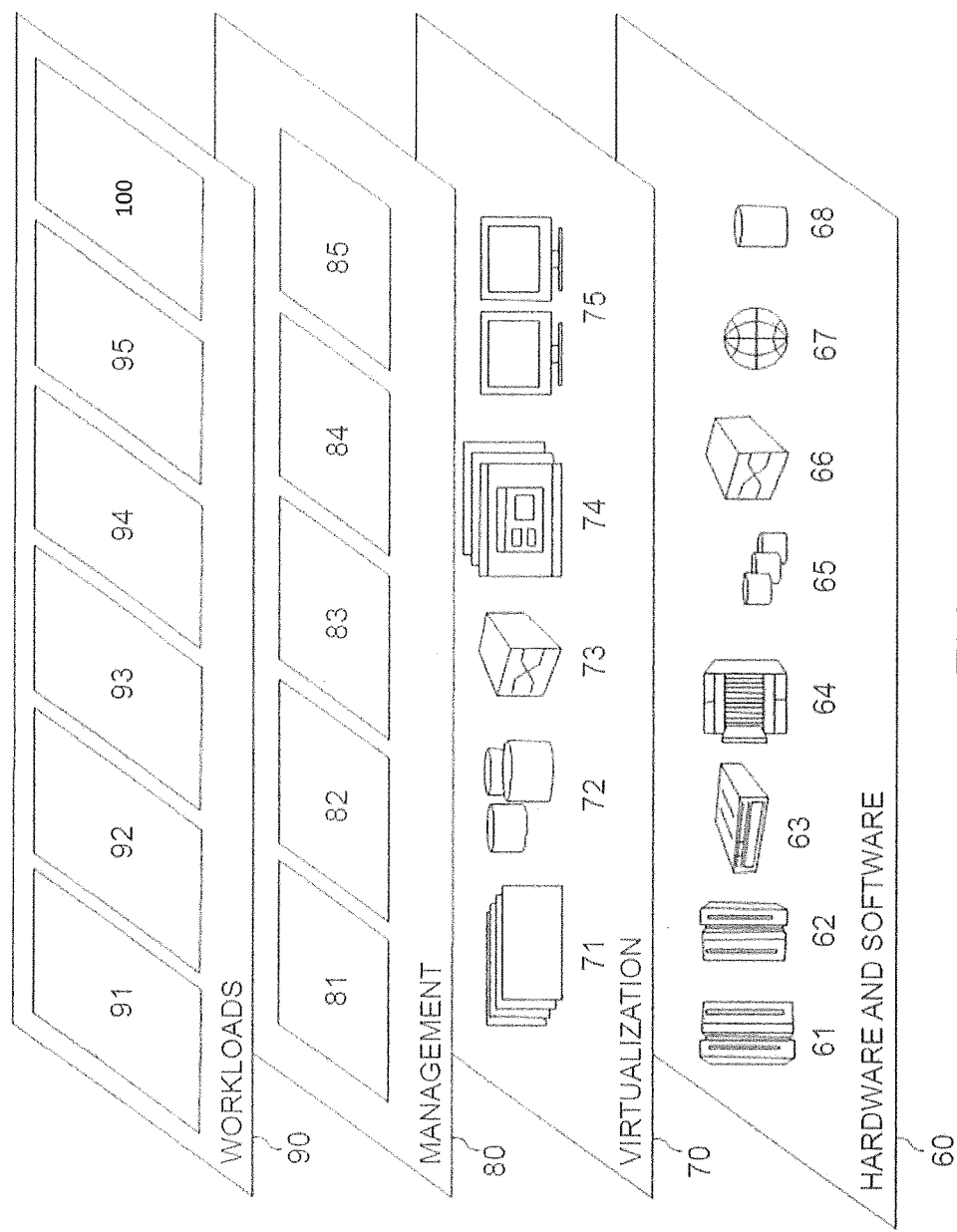
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the project documentation system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A project documentation method for generating documentation of a project from multimodal communications between users, stored in a database, the method comprising:
    matching the multimodal communications between users stored in the database to the project, the multimodal communications including formal documentation in a working medium of the project and informal communication outside the working medium of the project;
    associating a chat thread of the multimodal communications to a sub-project of the project;
    relating words of the chat thread and words in a text of the project;
    extracting text of the chat thread that is relevant to the text of the project;
    creating a document including the relevant text of the chat thread by compiling both the formal documentation and the informal communication into the document;
    deciding whether to update the document including the relevant text created by the extracting and the creating with newly extracted text based on a similarity between data of the document and the newly extracted text to avoid redundancies within the created document; and
    adding a back pointer to the text of the created document to refer back to the chat thread of the formal documentation in the working medium of the project and the informal communication outside the working medium of the project including the relevant text, a selection of the back pointer opening a program outside the working medium including the back pointer and re-directing the user to the relevant text in the program outside the working medium,
    wherein the deciding further decides to add extracted text of the chat thread when the informal communication in the chat thread is different from the formal documentation in the document.

2. The method of claim 1, further comprising merging each new document created by the creating with a previous document created by the creating.

3. The method of claim 1, wherein the deciding further decides whether to update the document including the relevant text based on a similarity between the data of the document and text within the project documentation.

4. The method of claim 1, wherein the extracting further extracts information about each user involved in the multimodal communications including the sub-project on which the user works, a role in the project for the user, and responsibilities of said user on each sub-project of the project.

5. A non-transitory computer-readable recording medium recording a project documentation program for generating documentation of a project from multimodal communications between users, stored in a database, the program causing a computer to perform:
    matching the multimodal communications between users stored in the database to the project, the multimodal communications including formal documentation in a working medium of the project and informal communication outside the working medium of the project;
    associating a chat thread of the multimodal communications to a sub-project of the project;
    relating words of the chat thread and words in a text of the project;
    extracting text of the chat thread that is relevant to the text of the project;
    creating a document including the relevant text of the chat thread by compiling both the formal documentation and the informal communication into the document;
    deciding whether to update the document including the relevant text created by the extracting and the creating with newly extracted text based on a similarity between data of the document and the newly extracted text to avoid redundancies within the created document;
    add a back pointer to the text of the created document to refer back to the chat thread of the formal documentation in the working medium of the project and the informal communication outside the working medium of the project including the relevant text, a selection of the back pointer opening a program outside the working medium including the back pointer and re-directing the user to the relevant text in the program outside the working medium,
    wherein the deciding further decides to add extracted text of the chat thread when the informal communication in the chat thread is different from the formal documentation in the document.

6. The non-transitory computer-readable recording medium of claim 5, further comprising merging each new document created by the creating with a previous document created by the creating.

7. The non-transitory computer-readable recording medium of claim 5, wherein the deciding further decides whether to update the document including the relevant text based on a similarity between the data of the document and text within the project documentation.

8. The non-transitory computer-readable recording medium of claim 5, wherein the extracting further extracts information about each user involved in the multimodal communications including the sub-project on which the user works, a role in the project for the user, and responsibilities of said user on each sub-project of the project.

9. A project documentation system having a hardware processor for generating documentation of a project from multimodal communications between users, stored in a database, the system comprising:
- a matching circuit configured to match the multimodal communications between users stored in the database to the project, the multimodal communications including formal documentation in a working medium of the project and informal communication outside the working medium of the project;
- an identification circuit configured to associate a chat thread of the multimodal communications to a sub-project of the project;
- a relating circuit configured to relate words of the chat thread and words in a text of the project;
- an extracting and creating circuit configured to extract text of the chat thread that is relevant to the text of the project and create a document including the relevant text of the chat thread by compiling both the formal documentation and the informal communication into the document;
- a decision circuit configured to decide whether to update the document including the relevant text created by the extracting and creating circuit with newly extracted text based on a similarity between data of the document and the newly extracted text to avoid redundancies within the created document; and
- a back pointing circuit configured to add a back pointer to the text of the created document to refer back to the chat thread of the formal documentation in the working medium of the project and the informal communication outside the working medium of the project including the relevant text, a selection of the back pointer opening a program outside the working medium including the back pointer and re-directing the user to the relevant text in the program outside the working medium,
- wherein the decision circuit decides to add extracted text of the chat thread when the informal communication in the chat thread is different from the formal documentation in the document.

10. The system of claim 9, further comprising a merging circuit configured to merge each new document created by the extracting and creating circuit with a previous document created by the extracting and creating circuit.

11. The system of claim 9, wherein the decision circuit further decides whether to update the document including the relevant text based on a similarity between the data of the document and text within the project documentation.

12. The system of claim 9, wherein the extracting and creating circuit further extracts information about each user involved in the multimodal communications including the sub-project on which the user works, a role in the project for the user, and responsibilities of said user on each sub-project of the project.

13. The system of claim 9, wherein information related to a version of the project is extracted by the extracting and creating circuit from the chat thread that is relevant to the text of the project.

14. The system of claim 9, wherein the relating circuit further performs static project analysis to extract a project component, a characteristic and a dependency including a package name, a class name, a method name and a signature, a data member name and class, a variable and variable class, and a constant and constant class which is related, and relating said extracted project component name and the characteristic to a chat thread subject line and the chat thread text.

15. The system of claim 9, wherein the identification circuit further associates a part of the chat thread to a project component, and
- wherein the extracting and creating circuit applies multi-document summarization to said part to automatically generate new documentation.

16. The system of claim 10, wherein the decision circuit further checks for similarities between the previous document and each new document created by the extracting and creating circuit.

17. The system of claim 12, wherein said extracted information is combined with information collected from multiple communications to create threads, wherein said information comprises the users involved in each communication, temporal information of each communication, software components associated with the communication, and project management information including timelines of software releases and timelines of agile scrums.

* * * * *